United States Patent
Yang et al.

(10) Patent No.: US 10,455,525 B2
(45) Date of Patent: Oct. 22, 2019

(54) METHOD FOR TRANSMITTING CONTROL INFORMATION, AND APPARATUS THEREFOR

(71) Applicant: LG ELECTRONICS INC., Seoul (KR)

(72) Inventors: Suckchel Yang, Seoul (KR); Joonkui Ahn, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 107 days.

(21) Appl. No.: 15/543,190

(22) PCT Filed: Jan. 28, 2016

(86) PCT No.: PCT/KR2016/000947
§ 371 (c)(1),
(2) Date: Jul. 12, 2017

(87) PCT Pub. No.: WO2016/122233
PCT Pub. Date: Aug. 4, 2016

(65) Prior Publication Data
US 2018/0014259 A1    Jan. 11, 2018

Related U.S. Application Data

(60) Provisional application No. 62/128,986, filed on Mar. 5, 2015, provisional application No. 62/108,544, filed on Jan. 28, 2015.

(51) Int. Cl.
*H04W 52/34* (2009.01)
*H04W 52/32* (2009.01)
(Continued)

(52) U.S. Cl.
CPC .............. *H04W 52/32* (2013.01); *H04L 1/18* (2013.01); *H04L 1/1812* (2013.01);
(Continued)

(58) Field of Classification Search
CPC ...... H04L 1/18; H04L 1/1812; H04W 52/146; H04W 52/32; H04W 52/325; H04W 52/34; H04W 52/48
See application file for complete search history.

(56) References Cited

U.S. PATENT DOCUMENTS

2014/0192738 A1*  7/2014  Nam .................. H04L 5/001
                                                          370/329
2016/0174170 A1*  6/2016  Yang .................. H04W 36/22
                                                          370/329

FOREIGN PATENT DOCUMENTS

WO       2014109685       7/2014

OTHER PUBLICATIONS

PCT International Application No. PCT/KR2016/000947, Written Opinion of the International Searching Authority dated Jul. 7, 2016, 18 pages.

(Continued)

*Primary Examiner* — Khaled M Kassim
*Assistant Examiner* — Zhaohui Yang
(74) *Attorney, Agent, or Firm* — Lee Hong Degerman Kang & Waimey

(57) ABSTRACT

The present invention relates to a wireless communication system. Specifically, the present invention relates to a method comprising: configuring a first cell group consisting of a PCell and zero or more SCells, and a second cell group consisting of SCell(s); determining transmit power of a first PUCCH to be transmitted through the PCell; and determining transmit power of a second PUCCH to be transmitted through a predetermined SCell in the second cell group, wherein the transmit powers of the first PUCCH and the second PUCCH are adjusted so that the total sum of transmit power of a terminal is not greater than the maximum transmit power of the terminal, considering a minimum guaranteed power which is assigned to each cell group (Continued)

according to protection priorities between cell groups, and the minimum guaranteed power assigned to each cell group is selectively applied to a specific UCI among a plurality of UCIs.

2 Claims, 8 Drawing Sheets

(51) Int. Cl.
　　*H04L 1/18*　　　(2006.01)
　　*H04W 52/48*　　(2009.01)
　　*H04W 52/14*　　(2009.01)
(52) U.S. Cl.
　　CPC ....... *H04W 52/146* (2013.01); *H04W 52/325* (2013.01); *H04W 52/34* (2013.01); *H04W 52/48* (2013.01)

(56) References Cited

OTHER PUBLICATIONS

Qualcomm, "Power control for dual connectivity", 3GPP TSG RAN WG1 Meeting #78, R1-142949, Aug. 2014, 4 pages.

Samsung, "Remaining Power Control Aspects for Dual Connectivity", 3GPP TSG RAN WG1 Meeting #79, R1-144729, Nov. 2014, 4 pages.

Alcatel-Lucent, "Remaining Issues on UL Power Control and Power Scaling for Dual Connectivity", 3GPP TSG RAN WG1 Meeting #79, R1-145194, Nov. 2014, 4 pages.

HTC, "Remaining Details on UL Power Control in Dual Connectivity", 3GPP TSG RAN WG1 Meeting #78, R1-143031, Aug. 2014, 5 pages.

European Patent Office Application Serial No. 16743711.0, Search Report dated Aug. 24, 2018, 10 pages.

LG Electronics, "Remaining issues on power control for dual connectivity", 3GPP TSG RAN WG1 Meeting #78bis, R1-144032, Oct. 2014, XP050875332, 4 pages.

NTT DOCOMO, "Power-control mechanisms for dual connectivity", 3GPP TSG RAN WG1 Meeting #77, R1-142264, May 2014, XP050787858, 8 pages.

LG Electronics, "Summary of email discussion [77-11]: Details of priority rule based on UCI type across CGs for dual connectivity power control", 3GPP TSG RAN WG1 Meeting #77, R1-142776, May 2014, XP050815137, 13 pages.

\* cited by examiner

FIG. 7

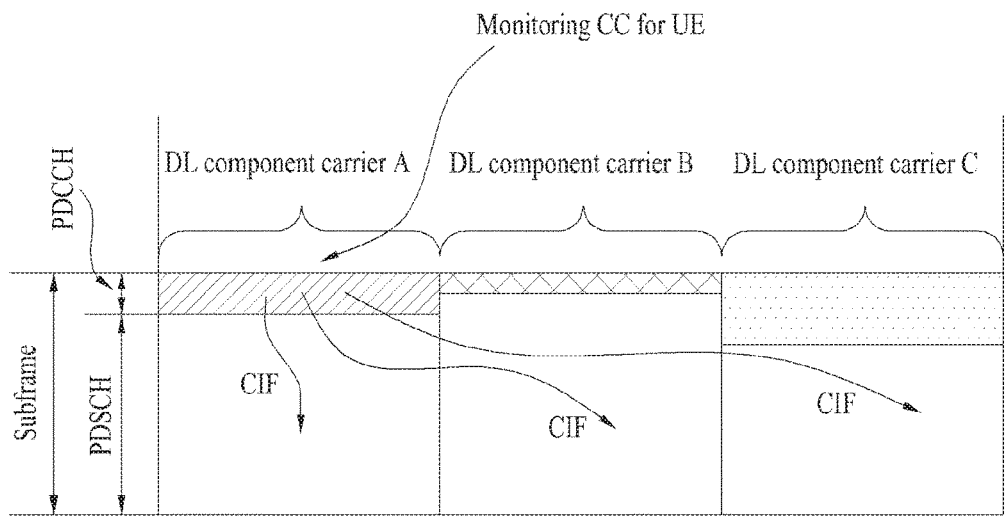

FIG. 8

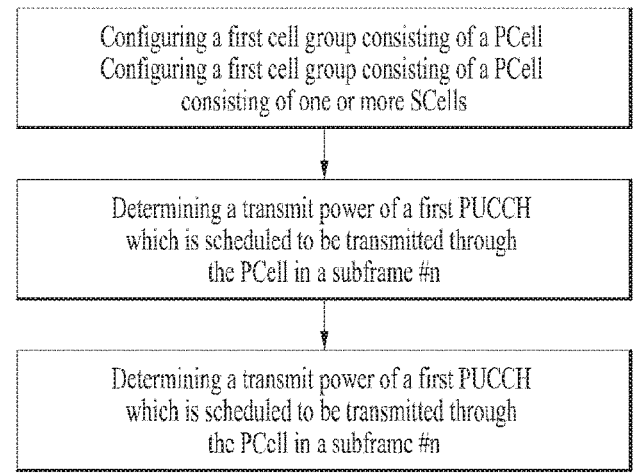

* A transmit power of the first PUCCH and a transmit power of the second PUCCH are controlled so that a sum of all transmit power of the UE is not larger than a maximum transmit power of the UE, considering minimum guaranteed powers which are assigned to each cell group according to protection priorities between cell groups, and
* The minimum guaranteed powers which are assigned to each cell group are selectively applied to a specific UCI among plural UCIs

METHOD FOR TRANSMITTING CONTROL INFORMATION, AND APPARATUS THEREFOR

CROSS-REFERENCE TO RELATED APPLICATIONS

This application is the National Stage filing under 35 U.S.C. 371 of International Application No. PCT/KR2016/000947, filed on Jan. 28, 2016, which claims the benefit of U.S. Provisional Application No. 62/108,544, filed on Jan. 28, 2015 and 62/128,986, filed on Mar. 5, 2015, the contents of which are all hereby incorporated by reference herein in their entirety.

TECHNICAL FIELD

The present invention relates to a wireless communication system, and more specifically, to a method for transmitting control information and a device for the same.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), or Single Carrier Frequency Division Multiple Access (SC-FDMA).

DETAILED DESCRIPTION OF THE INVENTION

Technical Problems

An object of the present invention is to provide a method of efficiently transmitting control information in a wireless communication system and an apparatus therefor. Another object of the present invention is to provide a method of efficiently transmitting uplink control information and efficiently managing resources on which the uplink control information is transmitted in a carrier aggregation (CA) system and an apparatus therefor.

The technical problems solved by the present invention are not limited to the above technical problems and those skilled in the art may understand other technical problems from the following description.

Technical Solutions

According to an aspect of the present invention, provided herein is a method of controlling a transmit power by a user equipment (UE) in a wireless communication system, including configuring a first cell group consisting of a primary cell (PCell) and zero or more secondary cells (SCells) and a second cell group consisting of one or more SCells; determining a transmit power of a first physical uplink control channel (PUCCH) to be transmitted through the PCell in a subframe #n; and determining a transmit power of a second PUCCH to be transmitted through a predefined SCell in the second cell group in the subframe #n, wherein the transmit power of the first PUCCH and the transmit power of the second PUCCH are adjusted such that the total sum of transmit powers of the UE does not exceed a maximum transmit power of the UE in consideration of a minimum guaranteed power allocated to each cell group according to protection priorities of the cell groups, and the minimum guaranteed power allocated to each cell group is selectively applied only to specific uplink control information (UCI) among a plurality of UCIs.

In another aspect of the present invention, provided herein is a user equipment (UE) for controlling a transmit power in a wireless communication system, including: a radio frequency (RF) unit; and a processor, wherein the processor is configured to configure a first cell group consisting of a primary cell (PCell) and zero or more secondary cells (SCells) and a second cell group consisting of one or more SCells, determine a transmit power of a first physical uplink control channel (PUCCH) to be transmitted through the PCell in a subframe #n, and determine a transmit power of a second PUCCH to be transmitted through a predefined SCell in the second cell group in the subframe #n, wherein the transmit power of the first PUCCH and the transmit power of the second PUCCH are adjusted such that the total sum of transmit powers of the UE does not exceed a maximum transmit power of the UE in consideration of a minimum guaranteed power allocated to each cell group according to protection priorities of the cell groups, and wherein the minimum guaranteed power allocated to each cell group is selectively applied only to specific uplink control information (UCI) among a plurality of UCIs.

The UCIs may include hybrid automatic repeat and request acknowledgement (HARQ-ACK), channel state information (CSI), and scheduling request (SR) and the specific UCI may be HARQ-ACK.

If first HARQ-ACK is scheduled to be transmitted through the first PUCCH and second HARQ-ACK is scheduled to be transmitted through the second PUCCH, transmit powers may be adjusted such that a minimum guaranteed power allocated to the first cell group is not guaranteed for a transmit power of the first HARQ-ACK and a minimum guaranteed power allocated to the second cell group is guaranteed only for a transmit power of the second HARQ-ACK.

The transmit power of the first HARQ-ACK may be determined using CG1.AN.power and the transmit power of the second HARQ-ACK may be determined using CG2.AN.power:

CG1.AN.power=min{(Pmax−min(CG2.AN.C-power, CG2.AN.G-power)), CG1.AN.C-power}

CG2.AN.power=min{(Pmax−CG1.AN.power), CG2.AN.C-power} where min{A, B} indicates the smaller of A and B, Pmax indicates a maximum transmit power of the UE, CG1.AN.C-power indicates an original transmit power of the first HARQ-ACK, G2.AN.C-power indicates an original transmit power of the second HARQ-ACK, and CG2.AN.G-power indicates the minimum guaranteed power allocated to the second cell group.

If a physical random access channel (PRACH) is transmitted in the first cell group in the subframe #n, the first HARQ-ACK is scheduled to be transmitted through the first PUCCH, and the second HARQ-ACK is scheduled to be transmitted through the second PUCCH, transmit powers may be adjusted such that a minimum guaranteed power allocated to the first cell group is not guaranteed for a transmit power of the first HARQ-ACK and a minimum guaranteed power allocated to the second cell group is guaranteed only for a transmit power of the second HARQ-ACK.

The transmit power of the first HARQ-ACK may be determined using CG1.AN.power and the transmit power of the second HARQ-ACK may be determined using CG2.AN.power:

CG1.AN.power=min{(Pmax−PRACH.power−min(min{ (Pmax−PRACH.power), CG2.AN.C-power}, CG2.AN.G-power)), CG1.AN.C-power}

CG2.AN.power=min{(Pmax−PRACH.power−CG1.AN.power), CG2.AN.C-power} where min{A, B} indicates the smaller of A and B, Pmax indicates a maximum transmit power of the UE, PRACH.power indicates a transmit power of a PRACH, CG1.AN.C-power indicates an original transmit power of the first HARQ-ACK, G2.AN.C-power indicates an original transmit power of the second HARQ-ACK, and CG2.AN.G-power indicates the minimum guaranteed power allocated to the second cell group.

Advantageous Effects

According to the present invention, control information can be efficiently transmitted in a wireless communication system. Specifically, uplink control information can be efficiently transmitted and resources on which the uplink control information is transmitted can be efficiently managed in a CA system.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings:

FIG. 7 illustrates scheduling in case of aggregation of a plurality of carriers;

FIG. 8 illustrates a UL transmission procedure according to an embodiment of the present invention.

BEST MODE FOR CARRYING OUT THE INVENTION

Embodiments of the present invention are applicable to a variety of wireless access technologies such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, Evolved UTRA (E-UTRA). UTRA is a part of Universal Mobile Telecommunications System (UMTS). $3^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) is an evolution of 3GPP LTE.

While the following description is given, centering on 3GPP LTE/LTE-A for clarity, this is purely exemplary and thus should not be construed as limiting the present invention. It should be noted that specific terms disclosed in the present invention are proposed for convenience of description and better understanding of the present invention, and the use of these specific terms may be changed to other formats within the technical scope or spirit of the present invention.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

Figure 1:
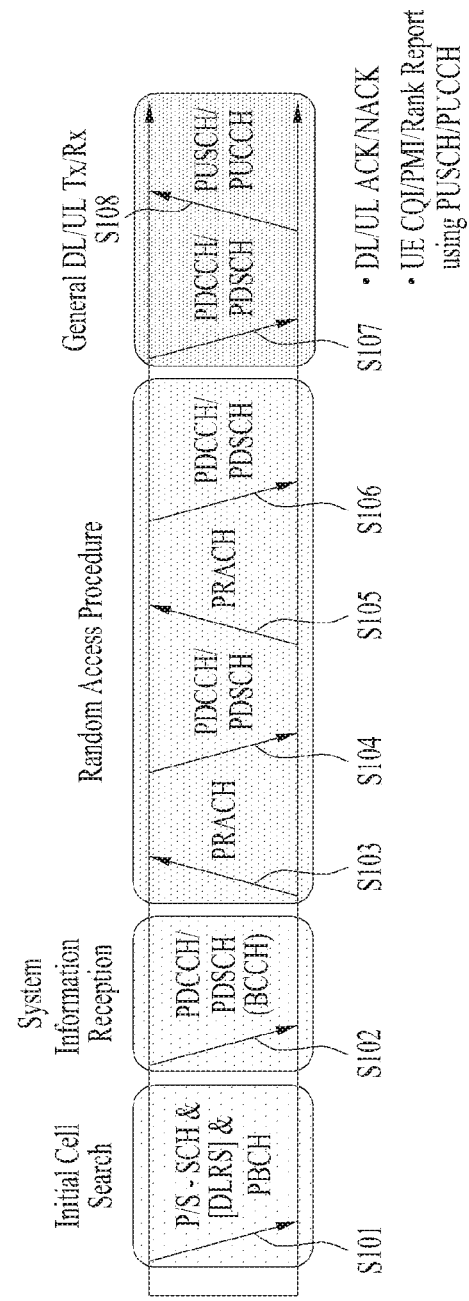
FIG. 1 illustrates physical channels used in 3GPP LTE(-A) and a signal transmission method using the same.

FIG. 1 illustrates physical channels used in 3GPP LTE(-A) and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the mean time, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
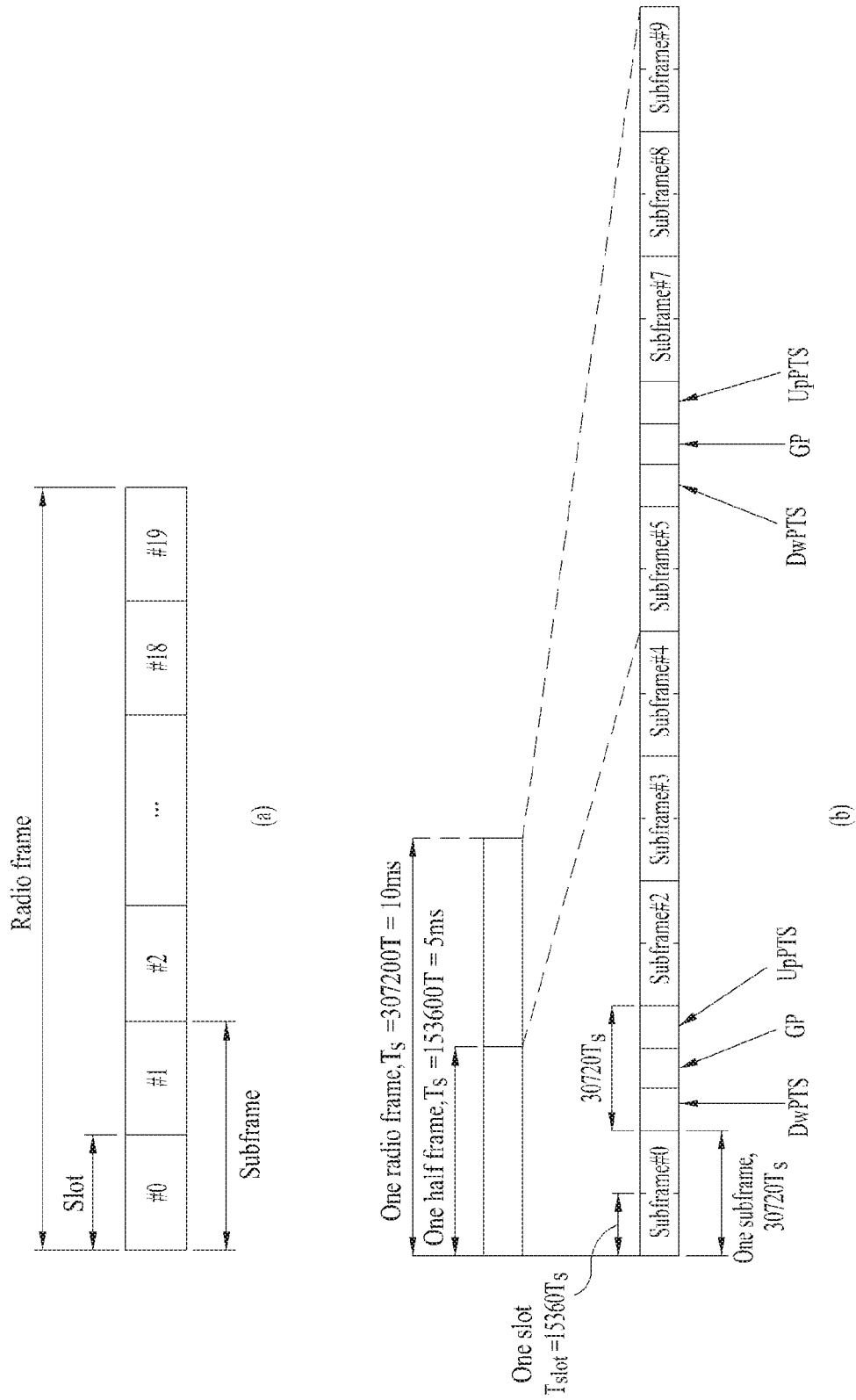
FIG. 2 illustrates a radio frame structure.

FIG. 2 illustrates a radio frame structure. In a cellular OFDM wireless packet communication system, uplink/downlink data packet transmission is performed on a subframe-by-subframe basis. A subframe is defined as a predetermined time interval including a plurality of OFDM symbols. LTE(-A) supports a type-1 radio frame structure applicable to FDD (Frequency Division Duplex) and a type-2 radio frame structure applicable to TDD (Time Division Duplex).

FIG. 2(a) illustrates the type-1 radio frame structure. A DL radio frame includes 10 subframes, each subframe including two slots in the time domain. A time required to transmit one subframe is defined as a transmission time interval (TTI). For example, one subframe may be 1 ms long and one slot may be 0.5 ms long. One slot includes a plurality of OFDM symbols in the time domain and a plurality of resource blocks (RBs) in the frequency domain. Since an LTE(-A) system uses OFDMA for DL, an OFDM symbol indicates one symbol period. The OFDM symbol may be called an SC-FDMA symbol or symbol period. An

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe.

The special subframe includes a DwPTS (Downlink Pilot TimeSlot), GP (Guard Period), and UpPTS (Uplink Pilot TimeSlot). DwPTS is a period reserved for downlink transmission and UpPTS is a period reserved for uplink transmission.

Table 2 shows DwPTS/GP/UpPTS according to special subframe configuration. In Table 2, Ts denotes sampling time.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

RB is a resource allocation unit including a plurality of contiguous subcarriers in one slot.

The number of OFDM symbols included in one slot may be changed according to configuration of a cyclic prefix (CP). For example, if each OFDM symbol is configured to include a normal CP, one slot may include 7 OFDM symbols. If each OFDM symbol is configured to include an extended CP, one slot may include 6 OFDM symbols.

FIG. 2(b) illustrates a type-2 radio frame structure. The type-2 radio frame includes 2 half frames. Each half frame includes 5 subframes each of which is composed of 2 slots.

Table 1 shows UL-DL configurations (UL-DL Cfgs) of subframes in a radio frame in the TDD mode.

The radio frame structure is merely exemplary and the number of subframes included in the radio frame, the number of slots included in a subframe, and the number of symbols included in a slot can vary.

Figure 3:
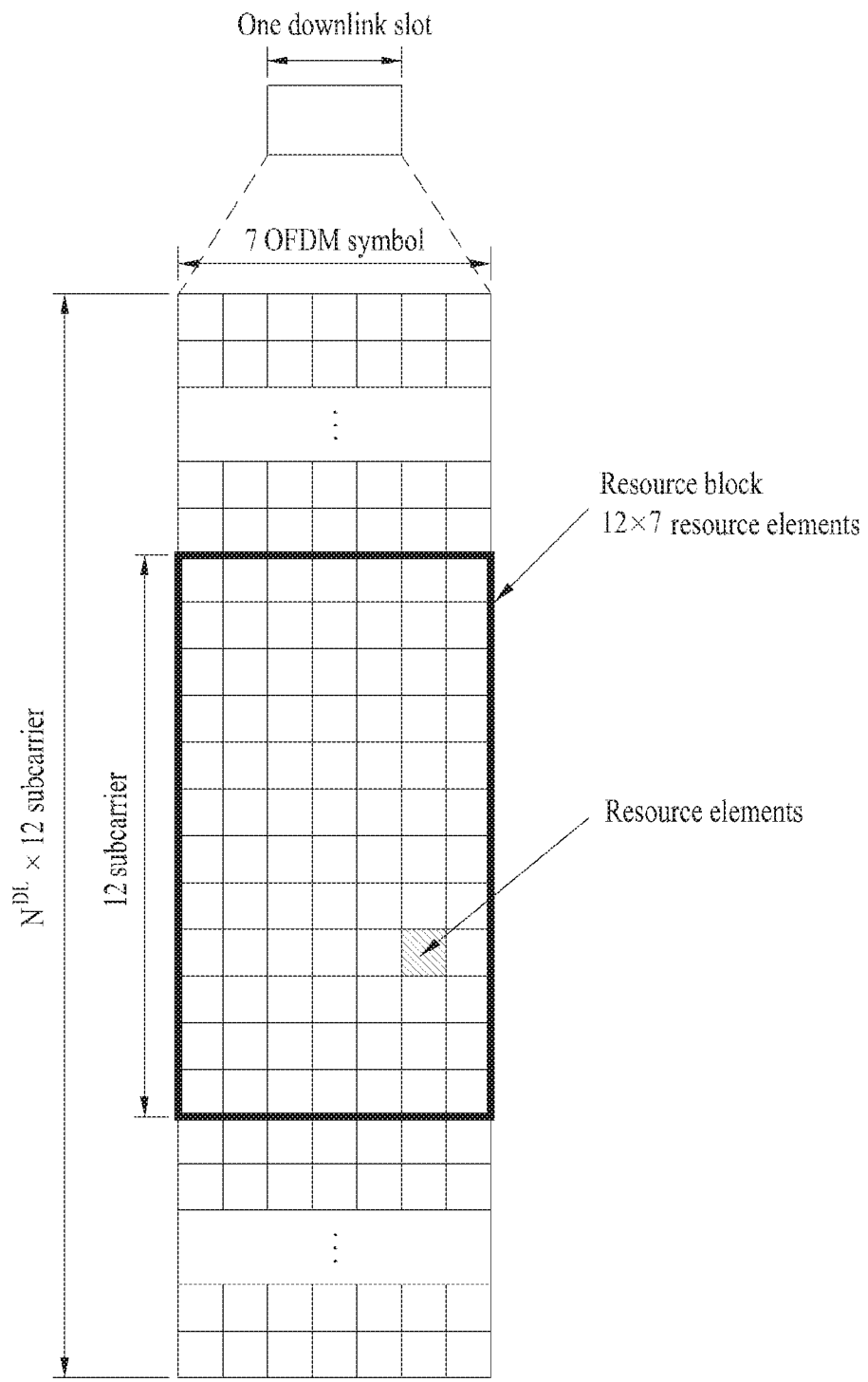
FIG. 3 illustrates a resource grid of a downlink slot.

FIG. 3 illustrates a resource grid of a downlink slot.

Referring to FIG. 3, a downlink slot includes a plurality of OFDM symbols in the time domain. One downlink slot may include 7(6) OFDM symbols, and one resource block (RB) may include 12 subcarriers in the frequency domain. Each element on the resource grid is referred to as a resource element (RE). One RB includes 12×7 (or 6) REs. The number NRB of RBs depends on a system bandwidth (BW). The structure of an uplink slot may be same as that of the downlink slot except that OFDM symbols by replaced by SC-FDMA symbols.

Figure 4:
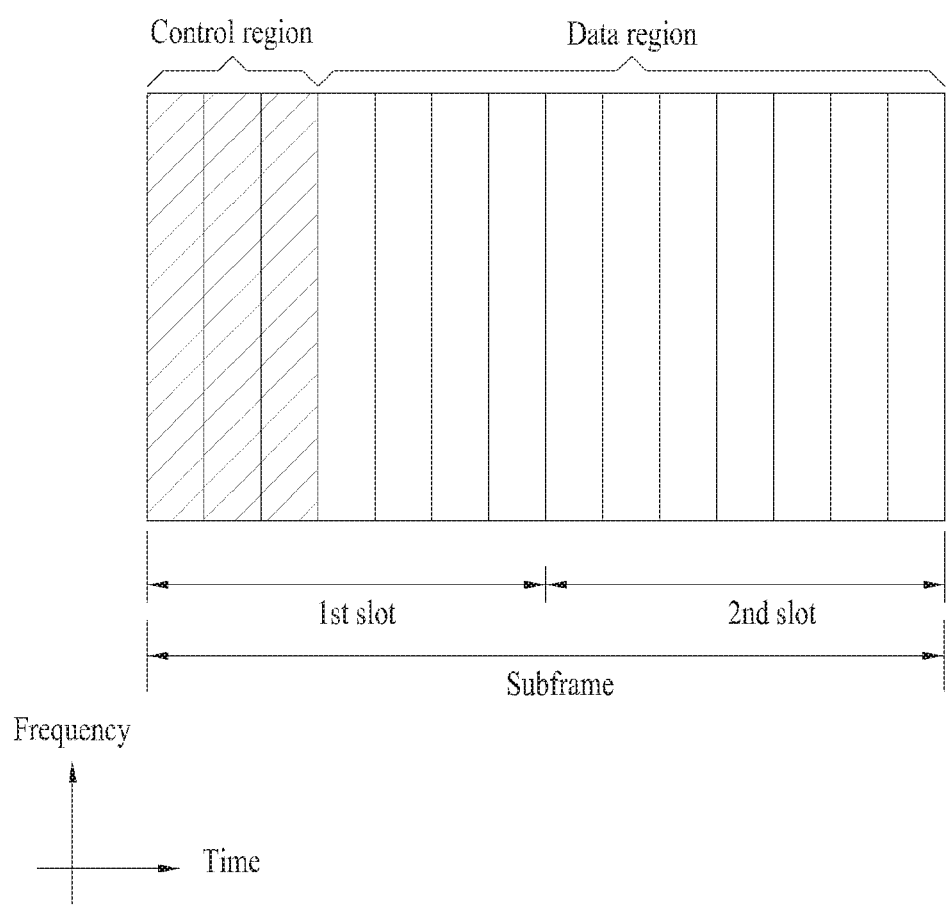
FIG. 4 illustrates a downlink subframe structure.

FIG. 4 illustrates a downlink subframe structure.

Referring to FIG. 4, a maximum of 3 (4) OFDM symbols located in a front portion of a first slot within a subframe correspond to a control region to which a control channel is allocated. The remaining OFDM symbols correspond to a data region to which a physical downlink shared chancel (PDSCH) is allocated. Examples of downlink control channels include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal.

Control information transmitted through the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. The DCI formats selectively include information such as hopping flag, RB allocation, MCS (Modulation Coding Scheme), RV (Redundancy Version), NDI (New Data Indicator), TPC (Transmit Power Control), cyclic shift for a DMRS (Demodulation Reference Signal), CQI (Channel Quality Information) request, HARQ process number, TPMI (Transmitted Precoding Matrix Indicator), PMI (Precoding Matrix Indicator) confirmation according as necessary.

The PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. A UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. A BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, then an identifier (e.g., cell-RNTI (C-RNTI)) of the UE may be masked to the CRC. Alternatively, when the PDCCH is for a paging message, a paging identifier (e.g., paging-RNTI (P-RNTI)) may be masked to the CRC. When the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

Figure 5:
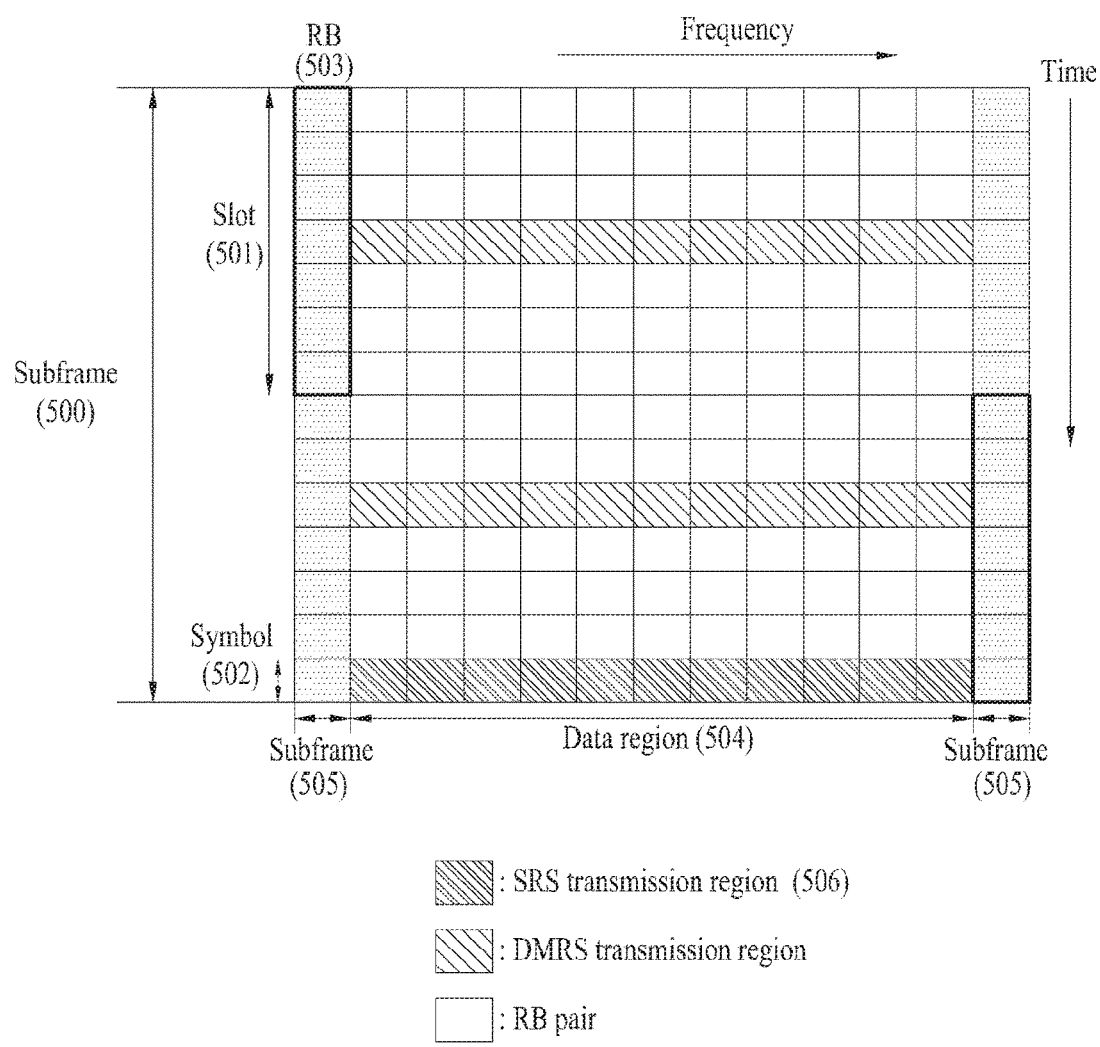
FIG. 5 illustrates an uplink subframe structure.

FIG. 5 illustrates an uplink subframe structure used in LTE.

Referring to FIG. 5, an uplink subframe includes a plurality of (e.g. 2) slots. A slot may include different numbers of SC-FDMA symbols according to CP lengths.

The uplink subframe is divided into a control region and a data region in the frequency domain. The data region is allocated with a PUSCH and used to carry a data signal such as audio data. The control region is allocated a PUCCH and used to carry uplink control information (UCI). The PUCCH includes an RB pair located at both ends of the data region in the frequency domain and hopped in a slot boundary.

The PUCCH can be used to transmit the following control information.

Scheduling Request (SR): This is information used to request a UL-SCH resource and is transmitted using On-Off Keying (OOK) scheme.

HARQ-ACK: This is a response to a downlink data packet (e.g. codeword) on a PDSCH and indicates whether the downlink data packet has been successfully received. A 1-bit A/N signal is transmitted as a response to a single downlink codeword and a 2-bit A/N signal is transmitted as a response to two downlink codewords.

Channel Quality Indicator (CQI): This is feedback information about a downlink channel. MIMO (Multiple Input Multiple Output)-related feedback information includes a rank indicator (RI), a precoding matrix indicator (PMI) and a precoding type indicator (PTI). 20 bits per subframe are used.

Table 3 shows the mapping relationship between PUCCH formats and UCI in LTE.

TABLE 3

| PUCCH format | UCI (Uplink Control Information) |
|---|---|
| Format 1 | SR (Scheduling Request) (non-modulated waveform) |
| Format 1a | 1-bit HARQ ACK/NACK (SR exist/non-exist) |
| Format 1b | 2-bit HARQ ACK/NACK (SR exist/non-exist) |
| Format 2 | CQI (20 coded bits) |
| Format 2 | CQI and 1- or 2-bit HARQ ACK/NACK (20 bits) (corresponding to only extended CP) |
| Format 2a | CQI and 1-bit HARQ ACK/NACK (20 + 1 coded bits) |
| Format 2b | CQI and 2-bit HARQ ACK/NACK (20 + 2 coded bits) |
| Format 3 (LTE-A) | HARQ ACK/NACK + SR (48 bits) |

Figure 6:
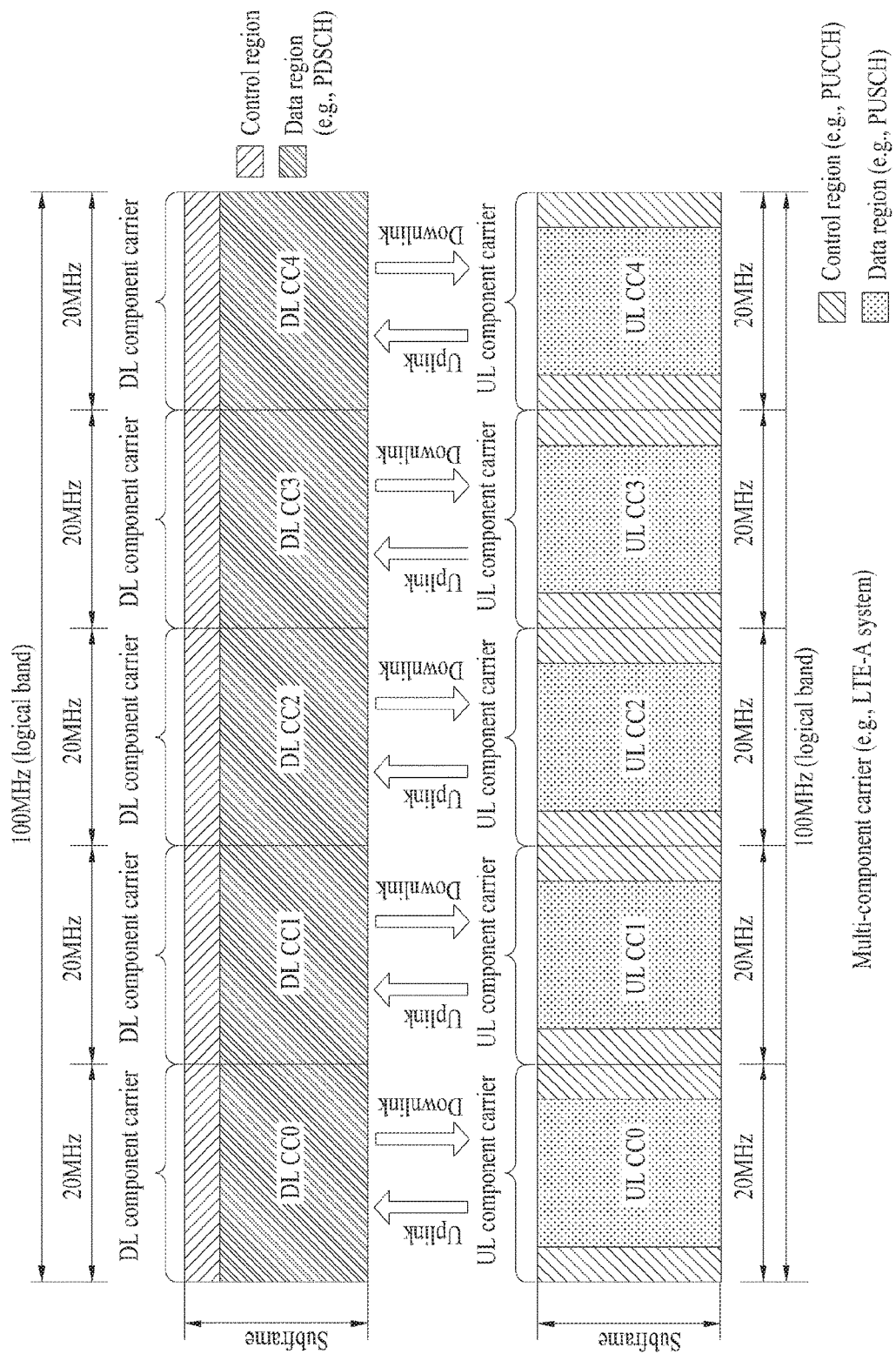
FIG. 6 illustrates a carrier aggregation (CA) communication system.

FIG. 6 illustrates a carrier aggregation (CA) communication system. LTE-A aggregates a plurality of UL/DL frequency blocks to support a wider UL/DL bandwidth in order to use a wider frequency band. Each frequency block is transmitted using a component carrier (CC). The CC may be regarded as a carrier frequency (or center carrier or a center frequency) for the corresponding frequency block.

Referring to FIG. 6, a plurality of UL/DL component carriers (CCs) can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. For example, when there are two DL CCs and one UL CC, the DL CCs can correspond to the UL CC in the ratio of 2:1. A DL CC/UL CC link can be fixed or semi-statically configured in the system. Even if the system bandwidth is configured with N CCs, a frequency band that a specific UE can monitor/receive can be limited to L (<N) CCs. Various parameters with respect to CA can be set cell-specifically, UE-group-specifically, or UE-specifically. Control information may be transmitted/received only through a specific CC. This specific CC can be referred to as a primary CC (PCC) (or anchor CC) and other CCs can be referred to as secondary CCs (SCCs).

In LTE-A, the concept of a cell is used to manage radio resources [see, 36.300 V10.2.0 (2010-12) 5.5. Carrier Aggregation; 7.5. Carrier Aggregation]. A cell is defined as a combination of downlink resources and uplink resources. Yet, the uplink resources are not mandatory. Therefore, a cell may be composed of downlink resources only or both downlink resources and uplink resources. The linkage between the carrier frequencies (or DL CCs) of downlink resources and the carrier frequencies (or UL CCs) of uplink resources may be indicated by system information when carrier aggregation is supported. A cell operating in primary frequency resources (or a PCC) may be referred to as a primary cell (PCell) and a cell operating in secondary frequency resources (or an SCC) may be referred to as a secondary cell (SCell). The PCell is used for a UE to establish an initial connection or re-establish a connection. The PCell may refer to a cell indicated during handover. The SCell may be configured after an RRC connection is established and may be used to provide additional radio resources. The PCell and the SCell may collectively be referred to as a serving cell. Accordingly, a single serving cell composed of a PCell only exists for a UE in an RRC_CONNECTED state, for which CA is not set or which does not support CA. On the other hand, one or more serving cells exist, including a PCell and entire SCells, for a UE in an RRC_CONNECTED state, for which CA is set. For CA, a network may configure one or more SCells in addition to an initially configured PCell, for a UE supporting CA during connection setup after an initial security activation operation is initiated.

When cross-carrier scheduling (or cross-CC scheduling) is applied, a PDCCH for downlink allocation can be transmitted on DL CC #0 and a PDSCH corresponding thereto can be transmitted on DL CC #2. For cross-CC scheduling, introduction of a carrier indicator field (CIF) can be considered. Presence or absence of the CIF in a PDCCH can be determined by higher layer signaling (e.g. RRC signaling) semi-statically and UE-specifically (or UE group-specifically). The baseline of PDCCH transmission is summarized as follows.

CIF disabled: a PDCCH on a DL CC is used to allocate a PDSCH resource on the same DL CC or a PUSCH resource on a linked UL CC.

CIF enabled: a PDCCH on a DL CC can be used to allocate a PDSCH or PUSCH resource on a specific DL/UL CC from among a plurality of aggregated DL/UL CCs using the CIF.

When the CIF is present, the BS can allocate a PDCCH monitoring DL CC to reduce BD complexity of the UE. The PDCCH monitoring DL CC set includes one or more DL CCs as parts of aggregated DL CCs and the UE detects/decodes a PDCCH only on the corresponding DL CCs. That is, when the BS schedules a PDSCH/PUSCH for the UE, a PDCCH is transmitted only through the PDCCH monitoring DL CC set. The PDCCH monitoring DL CC set can be set in a UE-specific, UE-group-specific or cell-specific manner. The term "PDCCH monitoring DL CC" can be replaced by the terms such as "monitoring carrier" and "monitoring cell". The term "CC" aggregated for the UE can be replaced by the terms such as "serving CC", "serving carrier" and "serving cell".

FIG. 7 illustrates scheduling when a plurality of carriers is aggregated. It is assumed that 3 DL CCs are aggregated and DL CC A is set to a PDCCH monitoring DL CC in FIG. 11. DL CC A, DL CC B and DL CC C can be called serving CCs, serving carriers, serving cells, etc. In case of CIF disabled, a DL CC can transmit only a PDCCH that schedules a PDSCH corresponding to the DL CC without a CIF according to LTE PDCCH rule. When the CIF is enabled, DL CC A (monitoring DL CC) can transmit not only a PDCCH that schedules the PDSCH corresponding to the DL CC A but also PDCCHs that schedule PDSCHs of other DL CCs using the CIF. In this case, A PDCCH is not transmitted in DL CC B/C which is not set to a PDCCH monitoring DL CC.

Embodiment: UL Power Control Method for Enhanced CA (eCA)

Currently, a Rel-10/11/12 based LTE-A system may support CA of up to 5 cells/carriers (hereinafter, referred to collectively as cells) with respect to one UE. In addition, a PUCCH that carries UCI (e.g., HARQ-ACK, CSI, etc.) associated with a plurality of cells has a structure configured to be transmitted only through a PCell. Meanwhile, in future systems, aggregation of 5 or more cells with respect to one UE is under consideration for the purpose of a higher data transmission rate. In this case, in order to reduce increase in the number of UCI transmissions/UCI size caused by increased number of cells and relieve overhead of PUCCH resources in the PCell due to increased number of UCI transmissions/UCI size, a method of enabling the PUCCH to be transmitted even through a specific SCell (hereinafter, ACell) may be considered.

Hereinafter, the present invention proposes a UL power control method suitable for the case in which a PUCCH is configured to be transmitted through a specific SCell in a CA situation and a UE operation related thereto. Basically, it is assumed that a HARQ-ACK PUCCH is configured to be transmitted through a specific SCell (i.e., ACell) in a state in which entire CA consists of two cell groups (CGs) of CG1 and CG2. In this case, HARQ-ACK feedback for CG1 (i.e., for DL data reception through CG1) may be transmitted through a PUCCH (or a PUSCH) on a PCell (or CG1) and HARQ-ACK feedback for CG2 may be transmitted through a PUCCH (or PUSCH) on the ACell (or CG2). Herein, the PCell may be included in CG1 and the ACell may be included in CG2. For convenience, while a situation in which one ACell and two CGs are configured is considered, the principle and operation proposed in the present invention may be extended in a similar way even when two or more ACells and three or more CGs are configured.

First, the terms are defined as follows to aid in describing the present invention.

C-power (Configured power): An original transmit power configured/indicated by an eNB through a transmit power control (TPC) command with respect to UL channel/signal transmission.

S-power (Scaled power): A transmit power after C-power is scaled (i.e., reduced) in a UL power control procedure.

G-power (Guaranteed power): A transmit power which can be guaranteed for a UL channel/signal. G-power may be independently configured per UL channel/signal (group).

CGx.UCI: UCI transmission on CGx. For example, CG1.HARQ-ACK means HARQ-ACK (simply, A/N or AN) transmission of CG1, i.e., HARQ-ACK transmission on CG1.

X.power: This means a (final) transmit power of X. For example, PRACH.power means a (final) transmit power of a PRACH.

The meaning of "G-power is applied to a specific UL channel/signal" may be that a power corresponding to a minimum power of at least the C-power and the G-power (i.e., min(C-power, G-power)) is allocated/guaranteed to/for the specific UL channel/signal. Herein, min(A, B) represents a smaller value of A and B.

Specifically, the present invention proposes that the G-power be configured on a per-CG basis according to protection priorities of CGs, wherein the G-power is configured/applied with respect only to specific UCI. The G-power per CG may be configured for only a specific CG or for both CG1 and CG2. The protection priorities of CGs refer to the protection priorities of CG1 and CG2 (e.g., CG1>CG2 or CG1=CG2) applied when transmissions of UCI of the same type (UL channel such as a PUCCH/PUSCH including the UCI) of the CGs overlap at the same timing. The specific UCI may include HARQ-ACK.

Meanwhile, when the protection priorities of the CGs are set to CG1>CG2, the transmit power of CG2 may be reduced first relative to the transmit power of CG1 or transmission of CG2 may be omitted. When the protection priorities of the CGs are set to CG1=CG2, the transmit powers of CG1 and CG2 may be reduced at the same ratio (i.e., equal scaling). Basically, the protection priorities of the CGs may be determined in consideration of protection priorities of UCIs such as A/N=SR>CSI or A/N>SR>CSI and protection priorities of channels/signals such as PRACH>PUCCH/PUSCH>SRS. If UCIs or channels/signals have the same protection priority, equal scaling is applied and, otherwise, the transmit power of a UCI or a channel/signal having a lower protection priority may be reduced first or transmission of the UCI or the channel/signal having a lower protection priority may be omitted.

The proposal of the present invention may be applied when the sum of C-powers of (plural) UL signals in entire CA exceeds a maximum transmit power Pmax of a UE. Herein, the C-power may be a power adjusted (e.g., scaled) not to exceed a maximum transmit power Pmax.c configured for a cell in which a corresponding signal is transmitted. Pmax.c represents a maximum transmit power of a c-th cell.

Method 1: Protection Priorities of CG1>CG2 are Applied and G-Power is Configured Only for A/N Transmission of CG2

The G-power may be configured/applied only to A/N (UL channel such as a PUCCH/PUSCH including A/N) transmission corresponding to CG2 based on the protection priorities of CG1>CG2. Specifically, the following power control procedure and operation may be performed according to a combination of UL channels, transmissions of which overlap at the same timing Case 1) PRACH+CG1.AN+CG2.AN With respect to CG2.AN transmission, Alt 1) the G-power may not be applied upon determining both the transmit power of a PRACH and the transmit power of CG1.AN, or Alt 2) the G-power may not be applied upon determining the transmit power of the PRACH and the G-power may be applied upon determining the transmit power of CG1.AN. An example of determining the transmit power of CG1.AN (e.g., CG1.AN.power) is as follows.

Alt 1)
CG1.AN.power=min{(Pmax−PRACH.power), CG1.AN.C-power}
CG2.AN.power=min{(Pmax−PRACH.power−CG1.AN.power), CG2.AN.C-power}
Alt 2)
CG1.AN.power=min{(Pmax−PRACH.power−min(CG2.AN.S-power, CG2.AN.G-power)), CG1.AN.C-power}
CG2.AN.S-power=min{(Pmax−PRACH.power),CG2.AN.C-power}
CG2.AN.power=min{(Pmax−PRACH.power−CG1.AN.power), CG2.AN.C-power}

Case 2) PRACH+CG2.AN

With respect to CG2.AN transmission, the G-power may not be applied upon determining the transmit power of the PRACH. An example of determining PRACH.power is as follows.

PRACH.power=min{Pmax, PRACH.C-power}
CG2.AN.power=min{(Pmax−PRACH.power), CG2. AN.C-power}

Case 3) CG1.AN+CG2.AN

With respect to CG2.AN transmission, the G-power may be applied upon determining the transmit power of CG1.AN and an example of determining CG1.AN.power is as follows.

CG1.AN.power=min{(Pmax−min(CG2.AN.C-power, CG2.AN.G-power)), CG1.AN.C-power}
CG2.AN.power=min{(Pmax−CG1.AN.power), CG2.AN.C-power}

Additionally, in Method 1 (and in methods below), a method of configuring/applying the G-power to both A/N transmission corresponding to CG2 and specific CSI (e.g., including RI) transmission (and performing the above operation based thereon) may be considered. In this case, the G-power may be independently configured with respect to A/N transmission and CSI transmission.

Method 2: Protection Priorities of CG1=CG2 are Applied and C-Power is Configured Only for A/N Transmission of CG1

The G-power may be configured/applied only to A/N (UL channel such as a PUCCH/PUSCH including A/N) transmission corresponding to CG1 based on the protection priorities of CG1=CG2. Specifically, the following power control procedure and operation may be performed according to a combination of UL channels, transmissions of which overlap at the same timing.

Case 1) PRACH+CG1.AN+CG2.AN

With respect to CG1.AN transmission, Alt 1) the G-power may not be applied upon determining both the transmit power of the PRACH and the transmit power of A/N per CG, or Alt 2) the G-power may not be applied upon determining the transmit power of the PRACH and the G-power may be applied upon determining the transmit power of A/N per CG.

In this scheme, equal power scaling is basically applied to CGs in a procedure of adjusting/determining the transmit power of A/N per CG. When the G-power is applied to CG1.AN, the power of CG1.AN may be limited to be reduced only to min(C-power, G-power) or more (e.g., CG1.AN.power≥min(C-power, G-power)). As a result, unequal power scaling may be applied to the CGs according to circumstance. For example, the transmit power of CG2 is reduced more than the transmit power of CG1.

For example, if the sum of transmit powers of A/N of CGs exceeds an available power (e.g., Pmax or (Pmax−PRACH.power)) even after equal power scaling is applied to the CGs until the power of CG1.AN becomes min(C-power, G-power), the power of CG2.AN may be further reduced while maintaining the power of CG1.AN as min(C-power, G-power).

An example of determining the transmit power of A/N per CG in Case 1 is as follows. Herein, w0/w1/w2 is a scaling factor which may be determined as one value (e.g., a maximum value satisfying the following equation) among real numbers from 0 to 1. Particularly, w1 and w2 may be determined as the same value or different values according to min(C-power, G-power) of CG1.AN, C-power of CG2.AN, (Pmax−PRACH.power), etc.

Alt 1)

w0×(CG1.AN.C-power+CG2.AN.C-power)≤(Pmax−PRACH.power)

CG1.AN.power=w0×CG1.AN.C-power, CG2.AN.power=w0×CG2. AN. C-power

Alt 2)

w1×CG1.AN.C-power+w2×CG2.AN.C-power≤(Pmax−PRACH.power)

CG1.AN.power=w1×CG1.AN.C-power, CG2.AN.power=w2×CG2. AN. C-power

Case 2) PRACH+CG1.AN

With respect to CG1.AN transmission, the G-power may not be applied upon determining the transmit power of the PRACH. An example of determining CG1.AN.power is as follows.

PRACH.power=min{Pmax, PRACH.C-power}

CG1.AN.power=min{(Pmax−PRACH.power), CG1.AN.C-power}

Case 3) CG1.AN+CG2.AN

With respect to CG1.AN transmission, the G-power may be applied upon determining the transmit power of A/N per CG. Basically, equal power scaling is applied to CGs, wherein the power of CG1.AN to which the G-power is applied may be limited to be reduced only to min(C-power, G-power) or more. An example of determining the transmit power of A/N per CG is as follows. Herein, w1 and w2 may be determined as the same value or different values according to min(C-power, G-power) of CG1.AN or the C-power of CG2.AN.

w1×CG1.AN.C-power+w2×CG2.AN.C-power≤Pmax

CG1.AN.power=w1×CG1.AN.C-power, CG2.AN. power=w2×CG2. AN. C-power

Additionally, in Method 2 (and in Method below), a method of configuring/applying the G-power to 1) A/N transmission and SR transmission or 2) all of A/N transmission, SR transmission, and specific CSI (e.g., including RI) transmission, corresponding to CG1 (and performing the above operation based thereon) may be considered. In this case, the G-power 1) may be independently configured with respect to A/N transmission, SR transmission, and CSI transmission, or 2) may be commonly configured with respect to A/N transmission and SR transmission and may be independently configured with respect to CSI transmission.

Method 3: Protection Priorities of CG1=CG2 are Applied and G-Power is Configured Only for A/N Transmissions of Both CG1 and CG2

The G-power may be configured/applied only to A/N (UL channel such as a PUCCH/PUSCH including A/N) transmissions corresponding to both CG1 and CG2 based on the protection priorities of CG1=CG2. The G-power configured for A/N transmission may be independently configured per CG. For example, the G-power configured for A/N transmission may be configured as a different value per CG. The following power control procedure and operation may be performed based on the G-power according to a combination of UL channels, transmissions of which overlap at the same timing.

Case 1) PRACH+CG1.AN+CG2.AN

With respect to A/N transmission per CG, Alt 1) the G-power may not be applied upon determining both the transmit power of the PRACH and the transmit power of A/N per CG, or Alt 2) the G-power may not be applied upon determining the transmit power of the PRACH and the G-power may be applied upon determining the transmit power of A/N per CG.

In a procedure of adjusting/determining the transmit power of A/N per CG, equal power scaling is basically applied to CGs. When the G-power is applied, the power of A/N per CG may be limited to be reduced only to min(C-power, G-power) or more. For example, the G-power may be limited to AN.power≥min(C-power, G-power) with respect to each CG. As a result, unequal power scaling may be applied to the CGs according to circumstance. For example, the transmit power of the other CG may be reduced more than the transmit power of a specific CG.

An example of determining the transmit power of A/N per CG in Case 1 is as follows. Herein, w1 and w2 may be determined as the same value or different values according to min(C-power, G-power) of A/N per CG and (Pmax−PRACH.power).

Alt 1)

w0×(CG1.AN.C-power+CG2.AN.C-power)≤(Pmax−PRACH.power)

CG1.AN.power=w0×CG1.AN.C-power, CG2.AN.power=w0×CG2. AN. C-power

Alt 2)

w1×CG1.AN.C-power+w2×CG2.AN.C-power≤(Pmax×PRACH.power)

CG1.AN.power=w1×CG1.AN.C-power, CG2.AN.power=w2×CG2. AN. C-power

Case 2) PRACH+CG1.AN (or CG2.AN)

With respect to CG1.AN (or CG2.AN) transmission, the G-power may not be applied upon determining the transmit power of the PRACH. An example of determining CG1.AN.power is as follows.

PRACH.power=min{Pmax, PRACH.C-power}

CG1.AN.power=min{(Pmax−PRACH.power), CG1.AN.C-power}

Case 3) CG1.AN+CG2.AN

The G-power may be applied to A/N transmission per CG. Equal power scaling is basically applied to CGs and the power of A/N per CG may be limited to be reduced only to min(C-power, G-power) or more. An example of determining the transmit power of A/N per CG is as follows. Herein, w1 and w2 may be determined as the same value or different values according to min(C-power, G-power) of A/N per CG.

w1×CG1.AN.C-power+w2×CG2.AN.C-power≤Pmax

CG1.AN.power=w1×CG1.AN.C-power, CG2.AN.power=w2×CG2. AN. C-power

Meanwhile, upon determining the transmit power of A/N per CG, a situation may occur in which it is inevitable to reduce the power of A/N of a specific CG to min(C-power, G-power) or less. For example, the situation may be one wherein min{min(CG1.AN.C-power, CG1.AN.G-power), min(CG2.AN.C-power, CG2.AN.G-power)}<available power (e.g., Pmax or (Pmax−PRACH.power))<sum{min(CG1.AN.C-power, CG1.AN.G-power), min(CG2.AN.C-power, CG2.AN.G-power)}. In this case, 1) the power of A/N of the specific CG is maintained as min(C-power, G-power), whereas the power of A/N of the other CG is reduced to min(C-power, G-power) or less, 2) the powers of A/N of CGs are reduced while maintaining application of equal power scaling to the CGs, or 3) the power of A/N of the specific CG is allocated first (e.g., as much as C-power) and the other power or no power (i.e., dropping of transmission) is allocated to A/N of the other CG.

In addition, upon adjusting/determining the transmit power of A/N per CG, a situation may occur in which it is inevitable to reduce all of the transmit powers of A/N of CGs to min(C-power, G-power) or less. For example, the situation may be one wherein available power (e.g., Pmax or (Pmax−PRACH.power))<min{min(CG1.AN.C-power, CG1.AN.G-power), min(CG2.AN.C-power, CG2.AN.G-power)}. In this case, 1) the power of the CGs is reduced while maintaining application of equal power scaling to the CGs or 2) the available power is allocated only to A/N transmission of a specific CG and no power is allocated to A/N transmission of the other CG or A/N transmission of the other CG may be dropped.

Additionally, with respect to CG1 in Method 3, the G-power may be configured/applied to Alt 1-0) A/N transmission only, Alt 1-1) A/N transmission and SR transmission, or Alt 1-2) all of A/N transmission, SR transmission, and specific CSI (e.g., including RI) transmission. With respect to CG2, the G-power may be configured/applied to Alt 2-0) A/N transmission only or Alt 2-1) both A/N transmission and specific CSI transmission. As a result, a method of configuring/applying the G-power to a combination of one of Alt 1-0/1/2 and one of Alt 2-0/1 (and performing the above operation) may be considered. With respect to each CG, the G-power 1) may be independently configured for each of A/N transmission, SR transmission, and CSI transmission, or 2) may be commonly configured for A/N transmission and SR transmission and independently configured for CSI transmission.

In the present invention, the G-power may be set to an absolute power value/level or the percentage of Pmax (or Pmax.c) or a C-power of a corresponding channel/signal. For example, the G-power may be set to X [%] of Pmax (or Pmax.c) or the C-power. Meanwhile, if a final power (after power control is performed) with respect to specific channel/signal (e.g., A/N) transmission to which the G-power is applied is less than min(C-power, G-power) or min(S-power, G-power), specific channel/signal transmission may be omitted (i.e., dropped). Meanwhile, if the G-power is applied to specific UCI (e.g. A/N) transmission, the G-power may be independently configured for each of PUCCH transmission and PUSCH transmission. In this case, the G-power may be configured/applied to both PUCCH transmission and PUSCH transmission or the G-power may be configured/applied to either PUCCH transmission or PUSCH transmission.

Meanwhile, if UCI transmissions having the same protection priority between a plurality of CGs collide at the same timing in a situation in which the above proposed methods or other UL power control methods are applied, whether to reduce the powers of the CGs at the same ratio (e.g., CG1=CG2, i.e., equal power scaling between the CGs) or which of transmit powers of the CGs should be reduced first or which of transmissions of the CGs should be omitted (e.g., CG1>CG2 or CG2>CG1) may be configured through higher-layer signaling (e.g., RRC). Such protection priorities of the CGs may be commonly configured with respect to all UCIs or may be independently configured with respect to each UCI (e.g., each of A/N, CSI, and SRS). In addition, when periodic CSI (i.e. p-CSI) transmission and aperiodic CSI (i.e. a-CSI) transmission between the CGs collide at the same timing, whether to reduce the powers of p-CSI and a-CSI at the same ratio (e.g., p-CSI=a-CSI, i.e., equal power scaling between the CGs) or whether to reduce first the transmit power of p-CSI or omit transmission of p-CSI (e.g., a-CSI>p-CSI) may be configured through higher-layer signaling (e.g., RRC).

FIG. 8 illustrates a UL transmission procedure according to an embodiment of the present invention.

Referring to FIG. 8, a UE may configure a first cell group consisting of a PCell and zero or more SCells and a second cell group consisting of one or more SCells (S802). A specific SCell in the second cell group may be configured to transmit a PUCCH. Next, the UE may determine the transmit power of a first PUCCH which is scheduled to be transmitted through the PCell in subframe #n (S804). Herein, UCI of the first cell group may be transmitted through the first PUCCH. The UE may determine the transmit power of a second PUCCH which is scheduled to be transmitted through a predefined SCell (i.e., ACell) in the second cell group in subframe #n (S806). Herein, UCI of the second cell group may be transmitted through the second PUCCH. Specifically, the transmit power of the first PUCCH and the transmit power of the second PUCCH may be adjusted such that the total sum of transmit powers of the UE does not exceed a maximum transmit power of the UE in consideration of a minimum guaranteed power allocated to each cell group according to protection priorities of the cell groups, wherein the minimum guaranteed power allocated to each cell group may be selectively applied only to specific UCI among a plurality of UCIs. The UCIs may include HARQ-ACK, CSI, and SR and the specific UCI may include HARQ-ACK.

For a detailed power control method, refer to the methods proposed in Method 1 to Method 3.

For example, referring to Method 1, power control may be performed as follows.

1) If first HARQ-ACK is scheduled to be transmitted through the first PUCCH and second HARQ-ACK is scheduled to be transmitted through the second PUCCH, transmit powers may be adjusted such that a minimum guaranteed power allocated to the first cell group is not guaranteed for the transmit power of the first HARQ-ACK and a minimum guaranteed power allocated to the second cell group is guaranteed only for the transmit power of the second HARQ-ACK. Specifically, the transmit power of the first HARQ-ACK may be determined using CG1.AN.power and the transmit power of the second HARQ-ACK may be determined using CG2.AN.power:

CG1.AN.power=min{(Pmax−min(CG2.AN.C-power, CG2.AN.G-power)), CG1.AN.C-power}

CG2.AN.power=min{(Pmax−CG1.AN.power), CG2.AN.C-power}

Herein, min{A, B} indicates the smaller of A and B, Pmax indicates a maximum transmit power of the UE, CG1.AN.C-power indicates an original transmit power of the first HARQ-ACK, CG2.AN.C-power indicates an original transmit power of the second HARQ-ACK, and CG2.AN.G-power indicates the minimum guaranteed power allocated to the second cell group.

2) When a PRACH is transmitted in the first cell group in subframe #n, the first HARQ-ACK is scheduled to be transmitted through the first PUCCH, and the second HARQ-ACK is scheduled to be transmitted through the second PUCCH, then transmit powers may be adjusted such that a minimum guaranteed power allocated to the first cell group is not guaranteed for the transmit power of the first HARQ-ACK and a minimum guaranteed power allocated to the second cell group is guaranteed only for the transmit power of the second HARQ-ACK. Specifically, the transmit power of the first HARQ-ACK may be determined using CG1.AN.power and the transmit power of the second HARQ-ACK may be determined using CG2.AN.power:

CG1.AN.power=min{(Pmax−PRACH.power−min(min{(Pmax−PRACH.power), CG2.AN.C-power}, CG2.AN.G-power)), CG1.AN.C-power}

CG2.AN.power=min{(Pmax−PRACH.power−CG1.AN.power), CG2.AN.C-power}

Herein, min{A, B} indicates the smaller of A and B, Pmax indicates a maximum transmit power of the UE, PRACH.power indicates the transmit power of a PRACH, CG1.AN.C-power indicates an original transmit power of the first HARQ-ACK, CG2.AN.C-power indicates an original transmit power of the second HARQ-ACK, and CG2.AN.G-power indicates a minimum guaranteed power allocated to the second cell group.

Figure 9:
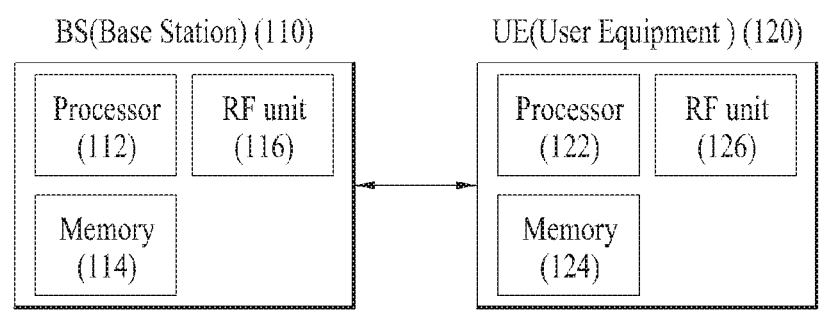
FIG. 9 illustrates a base station (BS) and a user equipment (UE) applicable to an embodiment of the present invention.

FIG. 9 illustrates a BS and a UE applicable to an embodiment of the present invention. In a system including a relay, the BS or the UE may be replaced with the relay.

Referring to FIG. 9, an RF communication system includes a BS 110 and a UE 120. The BS 110 includes a processor 112, a memory 114 and an RF unit 116. The processor 112 may be configured to implement the procedures and/or methods proposed by the present invention. The memory 114 is connected to the processor 112 and stores various types of information relating to operations of the processor 112. The RF unit 116 is connected to the processor 112 and transmits and/or receives RF signals. The UE 120 includes a processor 122, a memory 124 and an RF unit 126. The processor 122 may be configured to implement the procedures and/or methods proposed by the present invention. The memory 124 is connected to the processor 122 and stores various types of information relating to operations of the processor 122. The RF unit 126 is connected to the processor 122 and transmits and/or receives RF signals. The BS 110 and the UE 120 may have a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a description is given, centering on a data transmission and reception relationship between a BS and a UE. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to wireless communication apparatuses such as a UE, a relay, a BS, etc.

What is claimed is:

1. A method of controlling a transmit power by a user equipment (UE) in a wireless communication system, the method comprising:
    configuring a first cell group consisting of a primary cell (PCell) and zero or more secondary cells (SCells) and a second cell group consisting of one or more SCells;
    transmitting a physical random access channel (PRACH) in the first cell group in a time unit #n;
    transmitting a first Hybrid Automatic Repeat reQuest Acknowledgement (HARQ-ACK) via a first physical uplink control channel (PUCCH) in the PCell in the time unit #n; and
    transmitting a second HARQ-ACK via a second PUCCH in a predefined SCell of the second cell group in the time unit #n,
    wherein a transmit power of the first HARQ-ACK is determined based on a value satisfying CG1.AN.power and a transmit power of the second HARQ-ACK is determined based on a value satisfying CG2.AN.power:
    CG1.AN.power=min{(Pmax−PRACH.power−min (min{(Pmax−PRACH.power), CG2.AN.C-power}, CG2.AN.G-power)), CG1.AN.C-power}
    CG2.AN.power=min{(Pmax−PRACH.power−CG1. AN.power), CG2.AN.C-power}
    where min{A, B} indicates a smaller one of A and B, Pmax indicates a maximum transmit power of the UE, PRACH.power indicates a transmit power of the PRACH, CG1.AN.C-power indicates an original transmit power of the first HARQ-ACK, CG2.AN.C-power indicates an original transmit power of the second HARQ-ACK, and CG2.AN.G-power indicates a value related with power allocation.

2. A user equipment (UE) for controlling a transmit power in a wireless communication system, the UE comprising:
    a radio frequency (RF) unit; and
    a processor, wherein the processor is configured to
    configure a first cell group consisting of a primary cell (PCell) and zero or more secondary cells (SCells) and a second cell group consisting of one or more SCells,
    transmit a physical random access channel (PRACH) in the first cell group in a time unit #n,
    transmit a first Hybrid Automatic Repeat reQuest Acknowledgement (HARQ-ACK) via a first physical uplink control channel (PUCCH) in the PCell in the time unit #n, and transmit a second HARQ-ACK via a second PUCCH in a predefined SCell of the second cell group in the time unit #n, wherein a transmit power of the first HARQ-ACK is determined based on a value satisfying CG1.AN.power and a transmit power of the second HARQ-ACK is determined based on a value satisfying CG2.AN.power:

CG1.AN.power=min{(Pmax−PRACH.power−min(min{(Pmax−PRACH.power), CG2.AN.C-power}, CG2.AN.G-power)), CG1.AN.C-power}

CG2.AN.power=min{(Pmax−PRACH.power−CG1.AN.power), CG2.AN.C-power} where min{A, B} indicates a smaller one of A and B, Pmax indicates a maximum transmit power of the UE, PRACH.power indicates a transmit power of the PRACH, CG1.AN.C-power indicates an original transmit power of the first HARQ-ACK, CG2.AN.C-power indicates an original transmit power of the second HARQ-ACK, and CG2.AN.G-power indicates a value related with power allocation.

* * * * *